(12) United States Patent
Bhaskara et al.

(10) Patent No.: US 11,501,227 B2
(45) Date of Patent: Nov. 15, 2022

(54) PROVIDING ALTERNATE RESOURCE DEPLOYMENT GUIDANCE FOR USE WITH CLOUD SERVICES

(71) Applicant: Microsoft Technology Licensing, LLC, Redmond, WA (US)

(72) Inventors: Gowri Bhaskara, Redmond, WA (US); Wei Zou, Sammamish, WA (US); Brent Michael Jensen, Bothell, WA (US); Ahmed Ragab Nabhan Mostafa, Bellevue, WA (US); Bhaumik Chokshi, Redmond, WA (US); Zainab Hakim, Redmond, WA (US); Shanti Kemburu, Sammamish, WA (US); Ning Liu, Bellevue, WA (US); Benjamin Walter Martens, Woodinville, WA (US); Nicholas Anthony Swanson, Woodinville, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 214 days.

(21) Appl. No.: 16/707,897

(22) Filed: Dec. 9, 2019

(65) Prior Publication Data

US 2021/0174281 A1 Jun. 10, 2021

(51) Int. Cl.
*G06Q 10/06* (2012.01)
*G06F 9/50* (2006.01)
(Continued)

(52) U.S. Cl.
CPC ..... *G06Q 10/06315* (2013.01); *G06F 9/5005* (2013.01); *G06Q 10/067* (2013.01);
(Continued)

(58) Field of Classification Search
CPC ..... H04W 4/029; H04W 4/021; H04W 4/023; H04W 64/00; H04W 12/122; G06N 20/00;
(Continued)

(56) References Cited

U.S. PATENT DOCUMENTS

| 8,775,438 | B1 | 7/2014 | Brooker et al. |
| 10,243,819 | B1 * | 3/2019 | Chheda ............... H04L 41/0896 |

(Continued)

FOREIGN PATENT DOCUMENTS

EP 0384339 A2 8/1990

OTHER PUBLICATIONS

"International Search Report and Written Opinion Issued in PCT Application No. PCT/US20/059245", dated Feb. 10, 2021, 11 Pages.

*Primary Examiner* — Brian J. Gillis
*Assistant Examiner* — Thao D Duong
(74) *Attorney, Agent, or Firm* — Ray Quinney & Nebeker; Tiffany Healy

(57) ABSTRACT

The present disclosure relates to devices, methods, and computer-readable medium for providing recommendations for alternate resources to use for cloud services. The devices, methods, and computer-readable medium may receive a resource allocation request for a new resource of a computing system and may predict an occurrence of a capacity related allocation for the resource allocation request. The devices, methods, and computer-readable medium may identify alternate resources to use for the resource allocation request and may provide recommendations with the alternate resources.

16 Claims, 5 Drawing Sheets

(51) Int. Cl.
*H04L 47/70* (2022.01)
*H04L 67/10* (2022.01)

(52) U.S. Cl.
CPC .......... *H04L 47/821* (2013.01); *H04L 47/823* (2013.01); *H04L 47/827* (2013.01); *H04L 67/10* (2013.01)

(58) Field of Classification Search
CPC .......... G06N 3/0454; G06N 3/08; G06N 5/04; G06N 20/20; G06N 3/02; G06F 3/0482
See application file for complete search history.

(56) References Cited

U.S. PATENT DOCUMENTS

| | | | |
|---|---|---|---|
| 2011/0010518 A1 | 1/2011 | Kavuri et al. | |
| 2015/0120931 A1* | 4/2015 | Padala | G06F 9/5077 709/226 |
| 2016/0301624 A1* | 10/2016 | Gonzalez | G06F 9/5083 |
| 2016/0342902 A1* | 11/2016 | Pinckney | G06Q 30/02 |
| 2017/0061136 A1* | 3/2017 | Fung | G06F 21/6218 |
| 2018/0302340 A1* | 10/2018 | Alvarez Callau | H04L 47/821 |
| 2019/0050302 A1* | 2/2019 | Juniwal | G06F 3/0689 |
| 2019/0070509 A1* | 3/2019 | Kesack | H04W 4/18 |
| 2019/0129615 A1* | 5/2019 | Sundar | G06F 9/451 |
| 2019/0156433 A1* | 5/2019 | Lin | G06Q 50/01 |
| 2019/0332941 A1* | 10/2019 | Towal | G06N 3/084 |
| 2019/0356729 A1* | 11/2019 | Bivens | H04L 67/1002 |

\* cited by examiner

PROVIDING ALTERNATE RESOURCE DEPLOYMENT GUIDANCE FOR USE WITH CLOUD SERVICES

BACKGROUND

A cloud computing system refers to a collection of computing devices capable of providing remote services and resources. Cloud computing systems are experiencing unprecedented growth in the demand for resources (e.g., virtual machines (VMs) and Storage) in several regions. Typically, proactive efforts, such as supply chain modeling, enable cloud services to have the necessary capacity to meet the demands of their users. However, capacity related allocation failures may occur, and customers may receive an error message indicating that an allocation failure occurred. When a capacity related allocation failure occurs, customers may spend additional time and/or money with a support team, revisit architectural plans, and/or may leave a platform out of frustration for failing to achieve the perception of unlimited resource capacity.

These and other problems exist in provisioning resources for cloud computing systems.

BRIEF SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

One example implementation relates to a method. The method may include receiving a resource allocation request for a new resource in a computing system, wherein the resource allocation request identifies a resource subtype of the new resource and a region for the new resource. The method may include predicting an occurrence of a capacity related allocation failure for the resource allocation request using capacity predictions derived from supply chain modeling of a capacity in the region requested. The method may include identifying a ranked list of alternate resources to use for the resource allocation request in response to the predicting of the occurrence of the capacity related allocation failure. The method may include providing at least one recommendation with the ranked list of alternate resources.

Another example implementation relates to a system. The system may include at least one memory to store data and instructions, at least one processor in communication with the at least one memory, and instructions stored in the memory, the instructions being executable by the one or more processors to: receive a resource allocation request for a new resource, wherein the resource allocation request identifies a resource subtype of the new resource and a region for the new resource; predict an occurrence of a capacity related allocation failure for the resource allocation request using capacity predictions derived from supply chain modeling of a capacity in the region requested; identify a ranked list of alternate resources to use for the resource allocation request in response to the predicting of the occurrence of the capacity related allocation failure; and provide at least one recommendation with the ranked list of alternate resources.

Another example implementation relates to a computer-readable medium storing instructions executable by a computer device. The computer-readable medium may include at least one instruction for causing the computer device to receive a resource allocation request for a new resource, wherein the resource allocation request identifies a resource subtype of the new resource and a region for the new resource. The computer-readable medium may include at least one instruction for causing the computer device to predict an occurrence of a capacity related allocation failure for the resource allocation request using capacity predictions derived from supply chain modeling of a capacity in the region requested. The computer-readable medium may include at least one instruction for causing the computer device to identify a ranked list of alternate resources to use for the resource allocation request in response to the predicting of the occurrence of the capacity related allocation failure. The computer-readable medium may include at least one instruction for causing the computer device to provide at least one recommendation with the ranked list of alternate resources.

Additional features and advantages will be set forth in the description, which follows, and in part will be obvious from the description, or may be learned by the practice of the teachings herein. Features and advantages of the disclosure may be realized and obtained by means of the instruments and combinations particularly pointed out in the appended claims. Features of the present disclosure will become more fully apparent from the following description and appended claims, or may be learned by the practice of the disclosure as set forth hereinafter.

DETAILED DESCRIPTION

Figure 1:
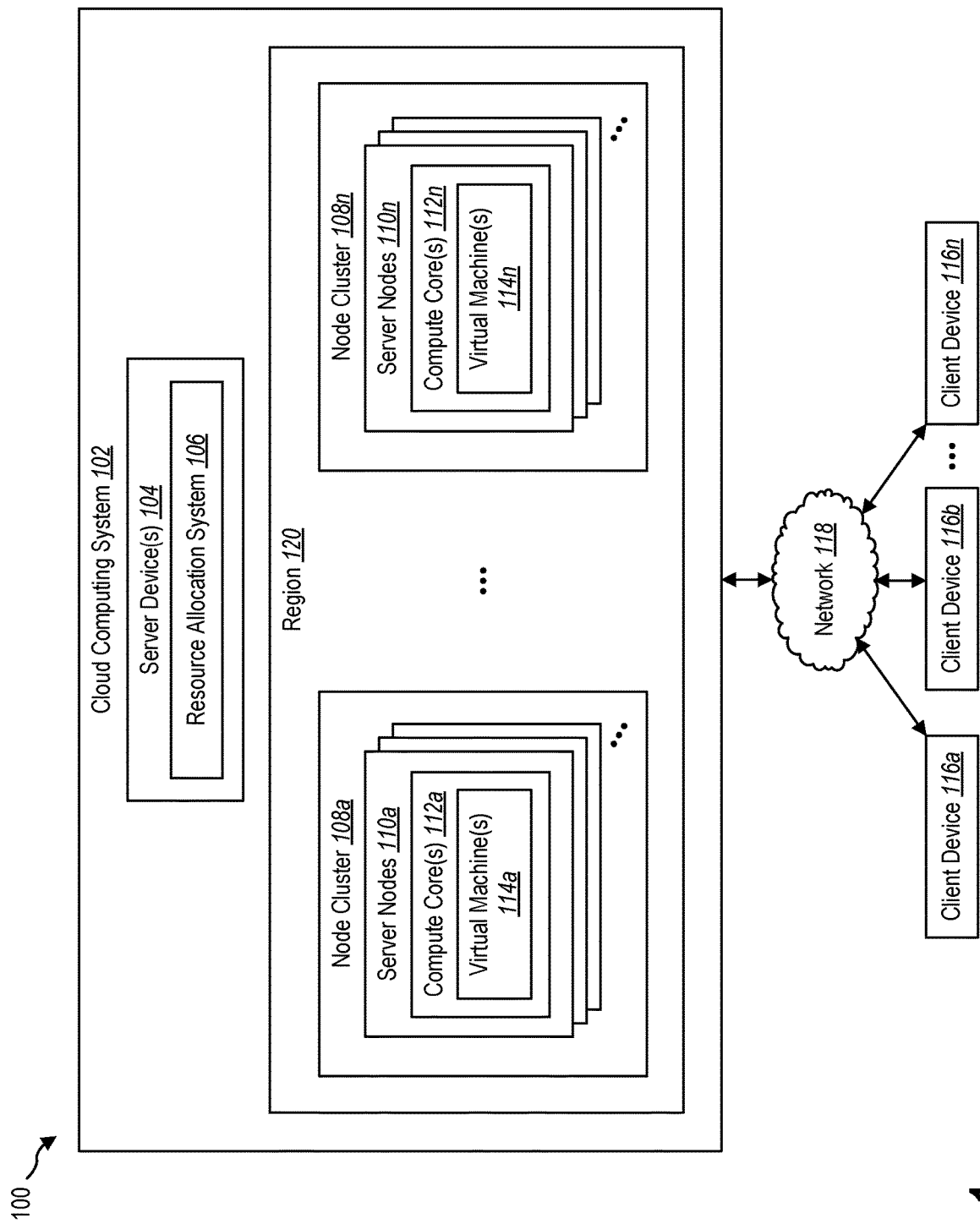
FIG. 1 illustrates an example environment of a cloud computing system for use with providing alternate resource deployment guidance for cloud services in accordance with an implementation.

The present disclosure generally relates to providing recommendations for alternate resource deployment guidance for resources to use for cloud services. Cloud platforms are experiencing growth in the demand for resources, such as virtual machines (VMs) and storage. Typically, proactive efforts, such as supply chain modeling, enable cloud services to have the necessary capacity to meet the demands of their users. However, there can be capacity related allocation failures that occur due to one or more reasons.

A capacity related allocation failure may occur in response to a resource being unavailable. Specific resources may have varying degrees of availability across all regions. In addition, legacy resources may not be available across all regions. A capacity related allocation failure may also occur in response to customers requesting an unusually large amount of a specific resource that unexpectedly reduces resource availability until new plans can address the gap. In addition, a capacity related allocation failure may occur in response to one or more business restrictions preventing allocation of resources. For example, business restrictions may be in place to prioritize existing customers preventing resource allocation for new customers.

Currently, when a capacity related allocation failure occurs, customers may receive an error message indicating an allocation failure occurred. Customers may retry a resource request and hope the request works, call support, and/or search for a deployment alternative. As such, customers may spend additional money and/or resources in attempting to find an alternate solution.

The present disclosure includes several practical applications that provide benefits and/or solve problems associated with capacity related allocation failures on a cloud computing system. The present disclosure may provide a recommendation service that receives a resource allocation request for a new resource in a computing system and may provide a confidence rating of the resource allocation request succeeding. The confidence rating may provide a prediction of the resource allocation succeeding within a time period following the resource allocation request. Customers may proceed with submitting allocation requests in response to the confidence ratings indicating that the resource allocation request will likely succeed.

The present disclosure may provide recommendations for alternate resources to use in response to the confidence ratings indicating that the resource allocation request will likely fail. The recommendations may provide a ranked list of alternate resources to use for requested resources. The recommendations may be provided in alternate regions where the requested resource subtype may be available. In addition, the recommendations may be provided for alternate resource sub-types similar to the requested resource sub-type and available in the same region as the requested resource allocation request. Thus, the present disclosure may allow customers to choose whether location or resource sub-types are more important when selecting an alternate resource to use for the requested resource.

The recommendations may provide guidance for alternate resources to use and/or actions customers may take (e.g., increasing limits) to allow the resource allocation request. For example, a business policy or restriction, such as quota limits, may prevent a customer from receiving a resource allocation. The present disclosure may notify customers when a constraint prevents success of the resource allocation request and may provide one or more actions customers may take to successfully receive the resource allocation.

The present disclosure may provide customers flexibility in moving forward with a resource allocation request if another option can be substituted for the original request. For example, a customer may request a large VM in Japan when there is insufficient capacity; the recommendations may provide large VMs in Korea or medium VMs in Japan as alternatives.

The present disclosure may also show a prediction of allocation success within a specified time period to customers via various customer interfaces so that customers may proactively plan out deployments in a desired region.

The present disclosure may also use the alternate resource guidance to only show available alternate resources in any deployment tool, preventing customers from selecting unavailable resources. As such, the present disclosure may be used to proactively prevent resource allocation failures. In addition, the present disclosure may be used to show alternate resource deployment choices that closely match the original allocation request, preventing uses from wasting time and frustration in identifying alternate solutions for resource deployments in a cloud computing system.

Referring now to FIG. 1, illustrated is an example environment 100 including a cloud computing system 102 for use with providing recommendations for alternate resource to use for cloud services. The cloud computing system 102 may include any number of devices. For example, the cloud computing system 102 includes one or more server device(s) 104 having a resource allocation system 106 implemented thereon.

In addition to the server device(s) 104, the cloud computing system 102 may include any number of node clusters 108a-n. One or more of the node clusters 108a-n may be grouped by geographic location (e.g., a region of node clusters). The node clusters 108a-n may also be implemented across multiple geographic locations (e.g., at different datacenters including one or multiple node clusters).

Each of the node clusters 108a-n may include a variety of server nodes having a number and variety of compute cores thereon. In addition, one or more virtual machines may be implemented on the compute cores of the server nodes. For example, a first node cluster 108a may include a first set of server nodes 110a. Each node from the set of server nodes 110a may include one or more compute cores 112a. As further shown, some or all of the compute cores 112a may include virtual machine(s) 114a implemented thereon. The node cluster 108a may include any number and variety of server nodes 110a. In addition, the server nodes 110a may include any number and variety of compute cores 112a. Moreover, the compute cores 112a may include any number and variety of virtual machines 114a. The cloud computing system 102 may include multiple node clusters 108a-n including respective server nodes 110a-n, compute cores 112a-n, and virtual machines 114a-n.

The environment 100 may also include a plurality of client devices 116a-n in communication with the cloud computing system 102. For example, the client devices 116a-n may communicate with server devices 104 via a network 118 to send one or more resource allocation requests for a new resource on cloud computing system 102. The new resource may include any type of resource in a computing system. For example, the new resource may include cloud resources, such as, but not limited to, networks, virtual machines 114a-n, and/or storage. In addition, the client devices 116a-n may communicate with different server nodes 110a-n via network 118. The client devices 116a-n may refer to various types of computing devices including, by way of example, mobile devices, desktop computers, server devices, or other types of computing devices. The network 118 may include one or multiple networks that use one or more communication platforms or technologies for transmitting data. For example, the network 118 may include the Internet or other data link that enables transport of electronic data between respective client devices 116a-n and devices of the cloud computing system 102.

In one or more implementations, the virtual machines 114a-n correspond to one or more customers and provide access to storage space, applications, or various cloud-based services hosted by the server nodes 110a-n. For example, a virtual machine may provide access to a large-scale computation application to a first client device 116a (or multiple client devices). As another example, a different virtual machine on the same server node or a different server node (on the same or different node cluster) may provide access to a gaming application to a second client device 112b (or multiple client devices).

As will be described in further detail below, the resource allocation system 106 may evaluate information associated with the compute cores 112a-n to accurately determine and/or predict capacity related allocation failures of resources on the cloud computing system 102. In particular, resource allocation system 106 may evaluate information about a specific region 120 to determine whether a capacity related allocation has already occurred and/or predict whether capacity related allocation failures will likely occur over a predetermined period of time (e.g., 7 days, 14 days, 30 days) for the region 120.

In addition to determining a prediction of capacity related allocation failures that may occur on region 120, resource allocation system 106 may also facilitate one or more recommendations for alternate resources to use for the allocation request in response to the prediction of capacity allocation failures. For example, as will be discussed in further detail below, upon identifying predicted capacity related allocation failures, resource allocation system 106 may provide recommendations for alternate resources to use for the resource allocation request.

As such, resource allocation system 106 may be used to show customers a chance of allocation success within a specified period via various user interfaces so that customers may plan out deployments in the desired region proactively.

Figure 2:
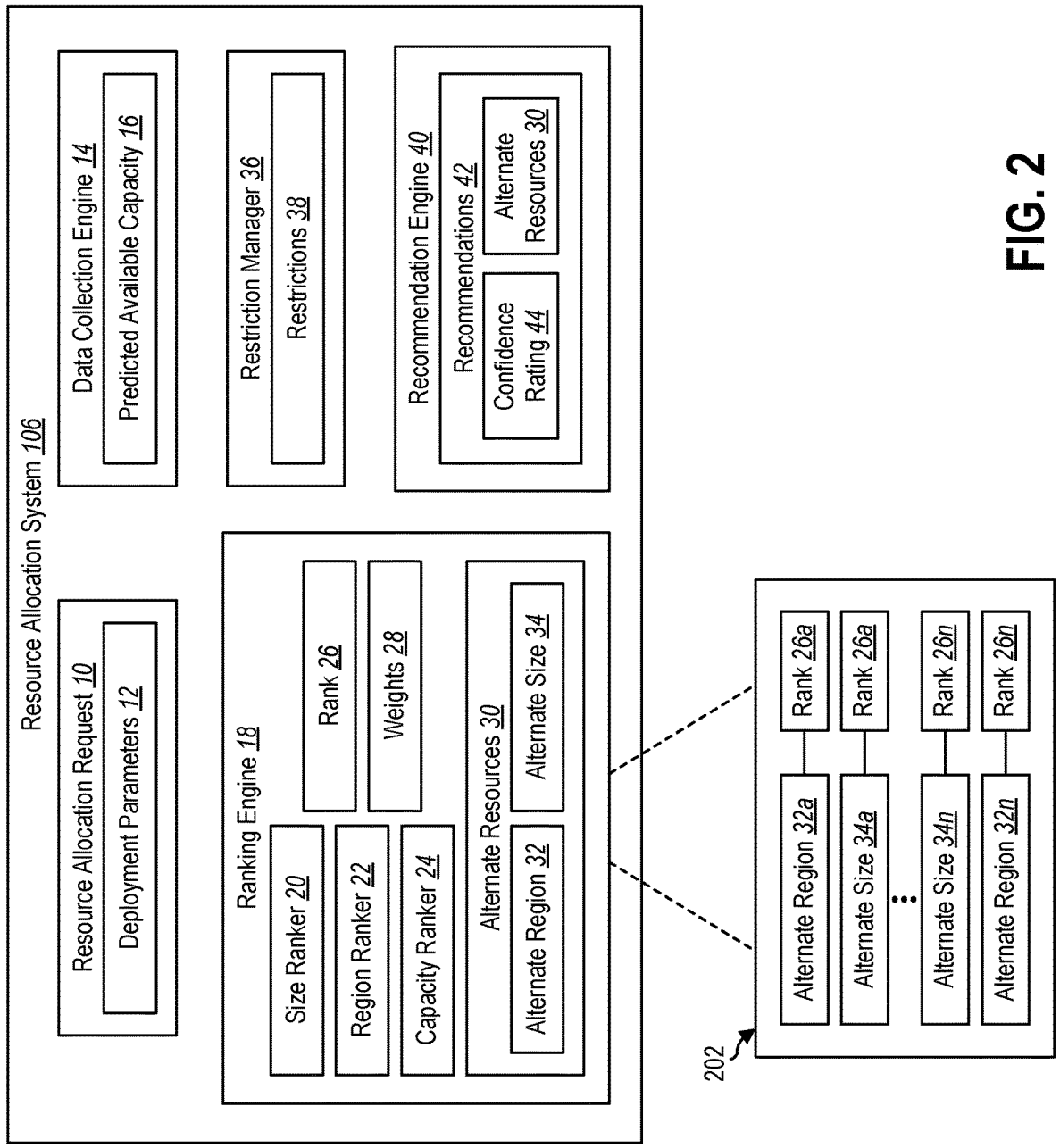
FIG. 2 is a schematic diagram of an example resource allocation system for use within a cloud computing system in accordance with an implementation.

Referring now to FIG. 2, illustrated is an example resource allocation system 106 for use within cloud computing system 102. Resource allocation system 106 may receive one or more resource allocation requests 10 for a new resource. The new virtual resource may include cloud resources, such as, but not limited to, networks, virtual machines 114 and/or storage for use with cloud computing system 102. For example, the resource allocation requests 10 may be received from one or more users of client devices 116*a-n* (also referred throughout as customers). The resource allocation requests 10 may include one or more deployment parameters 12 for the new resource. Deployment parameters 12 may include, but are not limited to, a subscription identification for a customer, a selected region (e.g., a geographical region), resource subtype (e.g., an amount of random access memory (RAM), central processing units (CPUs), and/or storage requested), a number of instances (e.g., how many VMs requested), and/or region/size ranking types. In addition, deployment parameters 12 may include required parameters and/or optional parameters. For example, a customer may input, or otherwise select, deployment parameters 12.

Resource allocation system 106 may use the deployment parameters 12 in determining whether a capacity related allocation failure will likely occur. A capacity related allocation failure may occur in response to a resource being unavailable. A capacity related allocation failure may also occur in response to customers requesting an unusually large amount of a specific resource that unexpectedly reduces resource availability until new plans can address the gap. For example, resource allocation system 106 may use the deployment parameters 12 to identify whether a requested resource is available in a requested region. In addition, a capacity related allocation failure may occur in response to one or more business restrictions preventing allocation of resources. For example, resource allocation system 106 may use the deployment parameters 12 to identify any business restrictions that may be in place to prioritize existing customers, thereby preventing resource allocation for new customers.

Resource allocation system 106 may include a data collection engine 14 that may collect or otherwise receive predicted available capacity 16 in a region (e.g., region 120) including information about nodes, available cores for deployment, and virtual machines on the node clusters 108*a-n*. The predicted available capacity 16 in region 120 may include supply chain modeling of the capacity in region 120. The supply chain modeling of the capacity in region 120 may include a combination of demand data and supply state data currently in use for the node clusters 108*a-n*. The demand data may include a variety of demand-related data including, but not limited to, existing customer workloads, reserved and blocked demand, virtual machine resources already deployed, reserved compute resources, blocked quota increase requests (e.g., a backlog), and/or promised quote increase in the near future (e.g., forelog). The supply state data may include the number of nodes and/or available cores for allocation. The supply state data may also include one or more expected or scheduled changes to the number of available cores. In an implementation, the predicted available capacity 16 in region 120 may include raw data associated with the demand and/or supply state of the node clusters 108*a-n*.

The predicted available capacity 16 in region 120 may include demand data and/or supply state data from node clusters 108*a-n* in a region corresponding to the selected region of the deployment parameters 12. In addition, the predicted available capacity 16 in region 120 may include demand data and/or supply state data from node clusters 108*a-n* in an area surrounding and/or adjacent to the selected region of the deployment parameters 12.

The predicted available capacity 16 in region 120 may enable resource allocation system 106 to identify a projected demand and/or supply state for region 120 over a predetermined duration of time (e.g., 7 days, 14 days, 30 days, 3 months, 1 year). The projected demand and/or supply state may include a prediction of available and/or occupied compute cores for region 120.

Resource allocation system 106 may use the predicted available capacity 16 in region 120 to determine whether a capacity related allocation failure will likely occur that prevents the resource allocation requests 10 from succeeding. Resource allocation system 106 may generate a confidence rating 44 indicating a likelihood of success for the resource allocation requests 10 within a predetermined duration of time (e.g., the next n days, where n is an integer) using the predicted available capacity 16 in region 120 (e.g., the demand data and/or the supply state data currently in use and/or a projected demand and/or supply state).

For example, the confidence rating 44 may include none or low in response to predicting that a capacity related allocation failure is likely to occur for the selected resource within the selected region (e.g., the selected resource is currently unavailable in the selected region or is predicted to be unavailable in the selected region). In another example, the confidence rating 44 may include none in response to a restriction or other business policy preventing the resource allocation. In yet another example, the confidence rating 44 may include medium or high in response to predicting that a capacity related allocation failure is unlikely to occur for the selected resource within the selected region (e.g., the selected resource is available in the selected region or is predicted to be available in the selected region).

Resource allocation system 106 may also include a ranking engine 18 that identifies alternate resources 30 to use for the resource allocation request 10 in response to a determination that a capacity related allocation failure is likely to occur for the selected resource of the resource allocation request 10. Alternate resources 30 may include, but are not limited to, alternate region resources 32 or alternate size resources 34. Alternate region resources 32 may include the requested resource in a different region. For example, the requested resource may be available in a nearby geographical region or a region pair of the original requested geographical region. Alternate size resources 34 may include subtypes similar to the requested resource that are available in the original requested geographical region.

In an implementation, ranking engine 18 may generate a ranked list 202 of alternate resources 30. The ranked list 202 of alternate resources 30 may include a plurality of alternate region resources 32*a-n* associated with a rank 26*a-n* and/or a plurality of alternate size resources 34*a-n* associated with a rank 26*a-n*. The plurality of alternate region resources 32*a-n* and/or the plurality of alternate size resources 34*a-n* may be ranked hierarchically in an order relative to one another using the associated rank 26*a-n*.

The ranks 26*a-n* may be generated by ranking engine 18 in response to one or more rankings of the alternate resources 30. Ranking engine 18 may have a size ranker 20 to order the alternate resources 30 in response to comparing a requested size in the deployment parameters 12 of the resource allocation request 10 to the size of the alternate resources 30. Size ranker 20 may identify alternate resources 30 with the same or similar size (e.g., same or similar amount of RAM, CPU, and/or storage) as the requested size. For example, alternate resources 30 with sizes similar to, or the same as, the requested size may have a higher rank relative to alternate resources 30 with sizes with greater differences from the requested size.

Ranking engine 18 may also have a region ranker 22 to order the alternate resources 30 using region. The order of the rankings may be in response to comparing a requested region in the deployment parameters 12 to the region of the alternate resource 30. Region ranker 22 may identify other regions in the same geography and/or same data center as the requested region in order to identify alternate resources 30 nearby or close to the requested region. For example, alternate resources 30 in the same geographical region or a nearby geographical region may have a higher rank relative to alternate resources 30 in a geographical region further away from the requested geographical region.

Ranking engine 18 may also have one or more capacity rankers 24 to order the alternate resources 30 using available capacity of the regions of the alternate resources 30. The capacity rankers 24 may order the alternate resources 30 using the available capacity and/or predicted capacity (e.g., when a region may lose capacity) of the regions of the alternate resources 30. For example, alternate resources 30 in a geographical region predicted to have a capacity for the requested resource may have a higher ranking relative to alternate resources 30 in a geographical region where the requested resource is predicted to be unavailable within a number of days (e.g., one week).

Ranking engine 18 may add and/or remove rankers (e.g., size ranker 20, region ranker 22, and/or capacity ranker 24) in response to business needs. In addition, ranking engine 18 may use any combination of size ranker 20, region ranker 22, and/or capacity ranker 24 in determining the ranked list 202 of alternate resources 30. Each of the size ranker 20, region ranker 22, and/or capacity ranker 24 may generate an independent rank 26 for the alternate resources 30.

In addition, ranking engine 18 may apply one or more weights 28 to the ranks 26 and generate a combined recommendation score for the ranks 26*a-n* to include in the ranked list 202 of alternate resources 30. For example, a higher weight 28 may be applied for a capacity ranker and a lower weight 28 applied for a region ranker. Another example may include a higher weight 28 applied for a capacity ranker and a lower weight applied for a size ranker.

As such, ranking engine 18 may generate a ranked list 202 of alternate resources 30 with associated ranks 26*a-n* ranked in an order of the highest available capacity, size most similar to the requested size, and region closest to the requested region.

Resource allocation system 106 may also include a restriction manager 36 that may apply one or more restrictions 38 to the ranked list 202 of alternate resources 30. Restrictions 38 may prevent the resource allocation. For example, a restriction 38 may include a subscription plan without the quota to support the resource allocation. Another example restriction 38 may include a business policy that gives existing customers priority over new customers. Restriction manager 36 may update the ranked list 202 of alternate resources 30 in response to the restrictions 38. For example, the ranked list 202 of alternate resources 30 may be updated by annotating the alternate resources 30 as blocked from the ranked list 202 of alternate resources 30 and/or provided with a lower rank 26 in response to the restrictions 38.

Resource allocation system 106 may include a recommendation engine 40 that generates one or more recommendations 42. For example, recommendations 42 may be generated in response to receiving a resource allocation request 10. Recommendations 42 may include, for example, a confidence rating 44 indicating a likelihood of success for the resource allocation request 10. The confidence ratings 44 may help customers in proceeding with resource allocation requests 10. In addition, recommendations 42 may include, for example, alternate resources 30 or a ranked list 202 of alternate resources 30 that may be used for the resource allocation request 10. Alternate resources 30 may be recommended in response to the confidence ratings 44 indicating that a resource allocation request 10 may be unsuccessful.

As such, resource allocation system 106 may provide users with flexibility in proceeding with resource allocation requests 10 when an original requested resource is unavailable and/or predicted to become unavailable within a predetermined time. In addition, resource allocation system 106 may provide customers with available alternate resources 30 to use for the resource allocation request 10 and may allow customers to choose whether location or resource subtype may be more important (or more desirable) for moving forward with the resource allocation requests 10.

Each of the components 14, 18, 36, 40 of the resource allocation system 106 may be in communication with each other using any suitable communication technologies. In addition, while the components 14, 18, 36, 40 of the resource allocation system 106 are shown to be separate in FIG. 2, any of the components or subcomponents may be combined into fewer components, such as into a single component, or divided into more components as may serve a particular implementation. As an illustrative example, components 14, 18, 36, 40 may be implemented on different server devices of the cloud computing system 102. As another illustrative example, one or more of the components 14, 18, 36, 40 may be implemented on an edge computing device that is not implemented on the hierarchy of devices of the cloud computing system 102.

Moreover, the components 14, 18, 36, 40 of the resource allocation system 106 may include hardware, software, or both. For example, the components of the resource allocation system 106 shown in FIG. 2 may include one or more instructions stored on a computer-readable storage medium and executable by processors of one or more computing devices. When executed by the one or more processors, the computer-executable instructions of one or more computing devices (e.g., server device(s) 104) can perform one or more methods described herein. Alternatively, the components of the resource allocation system 106 may include hardware, such as a special purpose processing device to perform a certain function or group of functions. Additionally, or alternatively, the components 14, 18, 36, 40 of the resource allocation system 106 may include a combination of computer-executable instructions and hardware.

Figure 3:
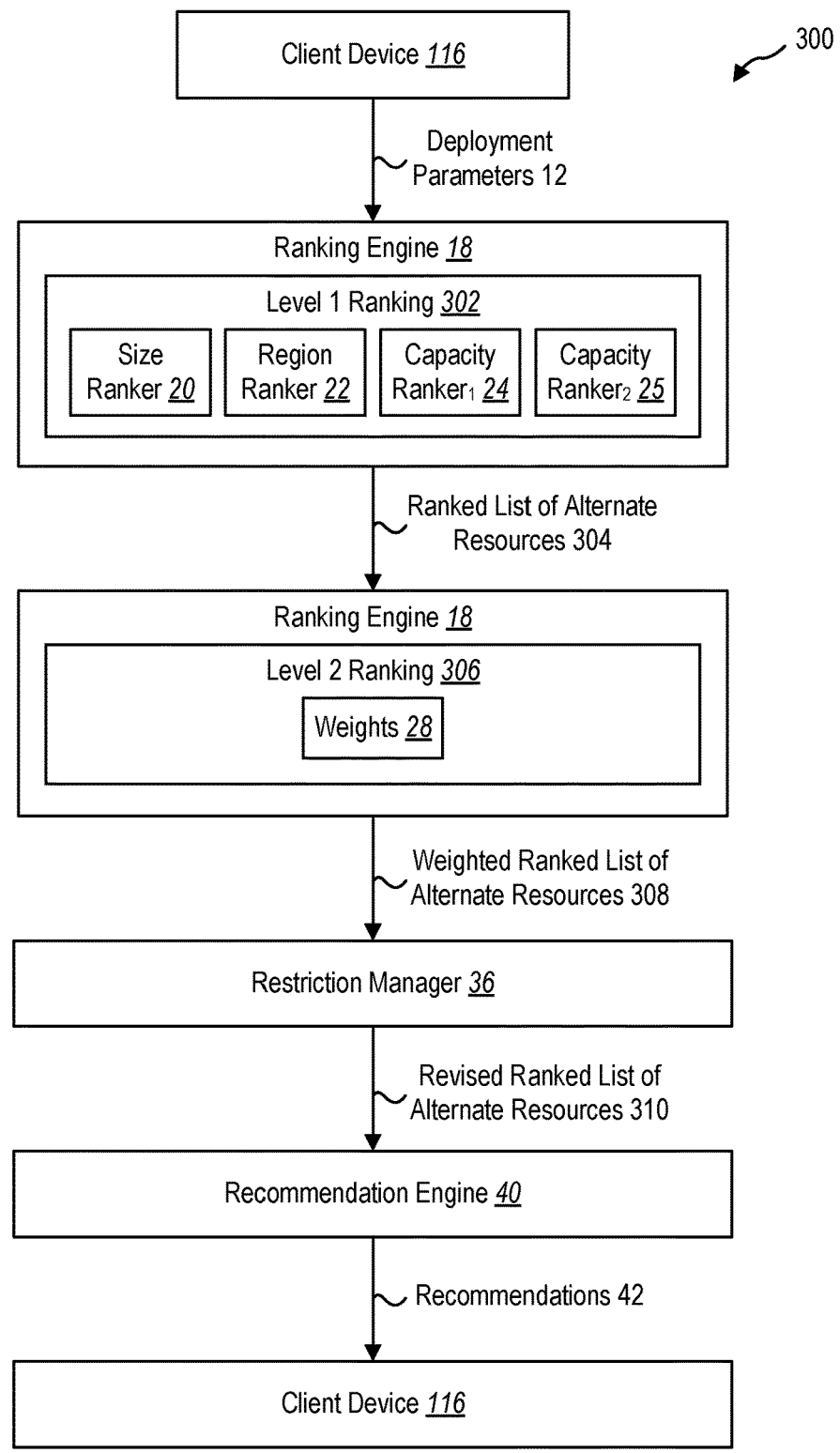
FIG. 3 illustrates an example framework for determining recommendations for alternate resource deployment guidance in accordance with an implementation.

Referring now to FIG. 3, an example implementation of the resource allocation system 106 for providing recommendations for alternate resources for use with a resource allocation request is described in connection with an example framework 300. The framework 300 is discussed below in connection with reference to the architectures of FIGS. 1 and 2.

Client device(s) 116 may generate one or more resource allocation requests 10 with deployment parameters 12 for a new resource. Deployment parameters 12 may include required parameters, such as, but not limited to, size and region of the requested resource. Deployment parameters 12 may also include optional parameters, such as, but not limited to, latency requirements, region pair requests, and/or same geographical region for the requested resource. If optional parameters are provided in the deployment parameters 12, ranking engine 18 may rank the regions of the alternate resources 30 as specified. If optional parameters are not specified in the deployment parameters 12, ranking engine 18 may apply a default region ranking (e.g., low latency, region pair, same geographical region) in ranking the regions of the alternate resources 30.

Ranking engine 18 may receive the deployment parameters 12 and may perform a level one ranking 302 of available alternate resources 30 using the deployment parameters 12. A level one ranking 302 of available alternate resources 30 may include applying a size ranker 20, a region ranker 22, a first capacity ranker 24 and/or a second capacity ranker 25 to the available alternate resources 30. Each of the size ranker 20, region ranker 22, first capacity ranker 24 and/or second capacity ranker 25 may provide independent rankings of the alternate resources 30. Level one rankers (e.g., size ranker 20, region ranker 22, first capacity ranker 24, and/or second capacity ranker 25) may be added or removed from ranking engine 18 in response to business needs.

Size ranker 20 may calculate a similarity distance score between the requested size in the deployment parameters 12 to all other sizes of the alternate resources 30. A weighted Euclidean distance measure may be used to calculate the size score for the alternate resources 30. Size configuration features such as, but not limited to, cores, memory, disks may be used as features to the Euclidean distance calculator.

In an implementation, the size similarity scores may be adjusted in response to one or more domain specific rules. Examples of domain specific rules may include, the requested size, latest version of size, legacy size, premium storage, isolated node size, hyperthreaded size, VM series, or VM type. Weights may be assigned to each of the size configuration features using for example, business rules or domain knowledge, to determine an importance of the size configuration features. For example, older sizes may not be available in many regions so a lower weight may be applied to older sizes relative to newer versions of the requested size. The weights may be used to alter the final similarity ranking score of the size of the alternate resources 30. Size ranker 20 may use the weights to artificially modify the similarity ranking score of the size of the alternate resources 30. As such, size ranker 20 may identify sizes of alternate resources 30 that are closest to, or the same as, the requested size in terms of the configuration.

Region ranker 22 may calculate the similarity between the requested region in the deployment parameters 12 to regions of the alternate resources 30 based on, for example, data center proximity, geography, and/or region pairs. If a region ranking option is not specified, region ranker 22 may optimize the region rankings by ranking higher region pairs, low latency regions, and/or the same geographic locations as the requested region. If the region ranking option is specified, region ranker 22 may calculate the score for the region rankings by adjusting the weight based on the specified input option. For example, certain customers may prefer to stay in the same geographical region whereas other customers might prefer to be in the same region pair for redundancy. Another example may include customers that always prefer low latency, and thus, high region rankings for these customers will be in the order of the closest regions.

First capacity ranker 24 and/or second capacity ranker 25 may use the predicted available capacity 16 for the region as a source to rank the alternate resources 30 choices based on available capacity. First capacity ranker 24 and/or second capacity ranker 25 may leverage predicted days to failure, days to exhaustion, allocation failures, and/or available capacity from the predicted available capacity 16 from the region of the alternate resources 30. Calculations performed by first capacity ranker 24 and/or second capacity ranker 25 may be based on the latest available snapshot of the predicted available capacity 16 for the region of the alternate resources 30. In an implementation, first capacity ranker 24 may use the projected demand and/or supply state from the predicted available capacity 16 for the region for the calculations and second capacity ranker 25 may use the actual demand and/or supply state from the predicted available capacity 16 for the calculations. In an implementation, the predicted available capacity 16 for the region may be received from regional level capacity predication data feed.

First capacity ranker 24 and/or second capacity ranker 25 may determine the requested cores based on the size and instances requested by the customer. In an implementation, first capacity ranker 24 and/or second capacity ranker 25 may calculate the percentage of remaining cores as a function of the cores available and generate a capacity score in response to the calculation. If the percentage of remaining cores is less than 10%, or if the number of allocation failures is greater than 10, first capacity ranker 24 and/or second capacity ranker 25 may automatically mark the capacity score as low and the probability of a successful allocation request as low as well.

First capacity ranker 24 and/or second capacity ranker 25 may use the capacity score for ranking the alternate resources 30 in an order where a higher capacity score indicates a higher chance of a successful allocation request and a lower capacity score indicates a lower chance of a successful allocation request. For example, any region/size combination that has a score of 7 or less may be marked as a low chance of success, a score between 7 to 50 may be marked as a medium success, and a score greater than 50 may be marked as a high success.

Ranking engine 18 may generate a ranked list of alternate resources 304. In an implementation, the ranked list of alternate resources 304 may be the same as the ranked list of alternate resources 202 in FIG. 2. The ranked list of alternate resources 304 may use the independent scores or rankings from size ranker 20, region ranker 22, first capacity ranker 24, and/or second capacity ranker 25 to generate the order of the alternate resources.

In addition, ranking engine 18 may perform a second level of ranking 306 on the ranked list of alternate resources 304. The second level of ranking 306 may apply weights 28 to the ranked list of alternate resources 304 to create a combined recommendation score for each of the alternate resources 30 included in the ranked list of alternate resources. The weights 28 may be determined using a combination of machine learning and/or domain experts. For example, the highest weight 28 may be for capacity ranker, followed by size and then region. The output of the second level of ranking 306 may include a weighted ranked list of alternate resources 308 ranked in an order of the highest available capacity, size most similar to the requested size, and region closest to the requested region.

Restriction manager 36 may receive the weighted ranked list of alternate resources 308 and may apply one or more restrictions 38 and/or other business policies to further improve the list of alternatives and generate a revised ranked list of alternate resources 310. An order of the alternate resources 30 may change in response to the restrictions 38 or other business policies. For example, older alternate resources 30 may be ranked lower than newer alternate resources 30 in response to a business policy to promote newer resources.

In addition, alternate resources 30 may be annotated, or otherwise identified, as blocked from the revised ranked list of alternate resources 310 if a quota limit of a customer does not allow the use of the alternate resources 30. In addition, alternate resources 30 may be annotated as blocked from the revised ranked list of alternate resources 30 in response to business policies preventing the use of the alternate resources 30. For example, if a business policy prevents new virtual machines in a specific region, the alternate resources 30 from the specific region may be blocked from the revised ranked list of alternate resources 310. As such, the revised ranked list of alternate resources 310 may only show available options to customers to proactively prevent resource allocation failures.

A recommendation engine 40 may receive the revised ranked list of alternate resources 310 and may generate one or more recommendations 42. Recommendations 42 may include the revised ranked list of alternate resources 310 for use for the resource allocation request 10. In addition, recommendations 42 may include a confidence rating 44 indicating a chance of allocation success for the resource allocation request 10.

Client device 116 may receive the one or more recommendations 42 and may present the recommendations 42 to a customer. Customers may plan out virtual resource deployments in desired regions proactively using the one or more recommendations 42.

Figure 4:
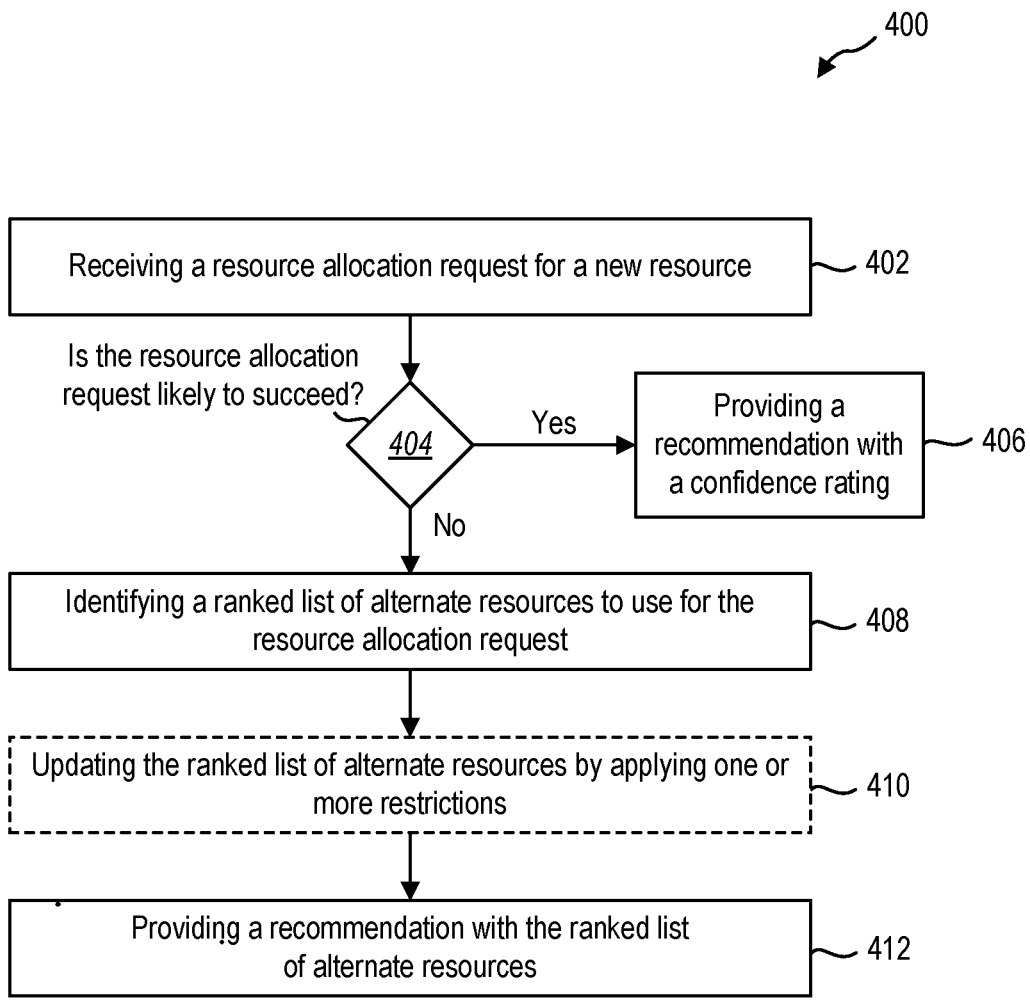
FIG. 4 illustrates an example method for providing recommendations for alternate resource deployment guidance in accordance with an implementation.

Referring now to FIG. 4, an example method 400 may be used by resource allocation system 106 (FIGS. 1 and 2) for providing recommendations for alternate resources 30 (FIG. 2) to use with a resource allocation request 10 (FIG. 2). The actions of method 400 may be discussed below with reference to the architectures of FIGS. 1-3.

At 402, method 400 may include receiving a resource allocation request for a new resource. Resource allocation system 106 may receive one or more resource allocation requests 10 for a new resource. The new resource may be any type of resource in a computing system. For example, the new resource may include cloud resources, such as, but not limited to networks, virtual machines 114 and/or storage for use with cloud computing system 102. In one configuration, the resource allocation requests 10 may be received from one or more users of client devices 116a-n (e.g., customers of cloud computing system 102). The resource allocation requests 10 may include one or more deployment parameters 12 for the new resource. Deployment parameters 12 may include, but are not limited to, a subscription identification for a customer, a selected geographical region, resource subtype (e.g., an amount of RAM, CPU, storage requested), a number of instances (e.g., how many VMs requested), and/or region/size ranking types. In addition, deployment parameters 12 may include required parameters (e.g., size and region) and/or optional parameters (latency preferences and/or region rankings). For example, a customer may input, or otherwise select, deployment parameters 12.

At 404, method 400 may include determining whether the resource allocation request is likely to succeed. Resource allocation system 106 may use the deployment parameters 12 in determining whether a capacity related allocation failure is likely to occur to prevent the resource allocations requests 10 from succeeding. A capacity related allocation failure may occur in response to a resource being unavailable. A capacity related allocation failure may also occur in response to customers requesting an unusually large amount of a specific resource that unexpectedly reduces resource availability until new plans can address the gap. In addition, a capacity related allocation failure may occur in response to one or more business restrictions.

Resource allocation system 106 may use the latest predicted available capacity 16 for the requested region in determining whether a capacity related allocation, failure may occur in the requested region for the requested resource. The predicted available capacity 16 for the region may include demand data and/or supply state data from node clusters 108a-n in region 120 corresponding to the selected region of the deployment parameters 12. In addition, the predicted available capacity 16 for region 120 may include supply chain modeling of the capacity in region 120. The supply chain modeling of the capacity in region 120 may include, for example, demand data and/or supply state data from node clusters 108a-n in region 120 and/or an area surrounding, or adjacent to, the selected region of the deployment parameters 12.

The predicted available capacity 16 for region 120 may enable resource allocation system 106 to identify a projected demand and/or supply state for region 120 over a predetermined duration of time (e.g., 7 days, 14 days, 30 days, 3 months, 1 year). The projected demand and/or supply state may include a prediction of available and/or occupied compute cores for the region 120.

Resource allocation system 106 may use the predicted available capacity 16 for region 120 to determine whether a capacity related allocation failure may occur to prevent the resource allocation requests 10 from succeeding. Resource allocation system 106 may generate a confidence rating 44 indicating a likelihood of success for the resource allocation requests 10 within a predetermined duration of time (e.g., the next n days, where n is an integer) using the predicted available capacity 16 for region 120 (e.g., the demand data and/or the supply state data currently in use and/or a projected demand and/or supply state).

For example, the confidence rating 44 may include none or low in response to predicting that a capacity related allocation failure is likely to occur for the selected resource within the selected region (e.g., the selected resource is currently unavailable in the selected region or is predicted to be unavailable in the selected region). In another example, the confidence rating 44 may include none in response to a restriction or other business policy preventing the resource allocation. In another example, the confidence rating 44 may include medium or high in response to predicting that a capacity related allocation failure is unlikely to occur for the selected resource within the selected region (e.g., the selected resource is available in the selected region or is predicted to be available in the selected region).

At 406, method 400 may include providing a recommendation with a confidence rating in response to determining that the resource allocation is likely to succeed. For example, recommendation engine 40 may generate one or more recommendations 42 with a confidence rating 44 indicating that a capacity allocation failure is unlikely to occur for the selected resource in the selected region (e.g., a confidence rating of medium or high). Recommendations 42 may refer to any communication provided to customers of cloud computing system 102. For example, recommendations 42 may be provided to customers via an email, text message, or other communication displayable via a graphical user interface of client devices 116.

At 408, method 400 may include identifying a ranked list of alternate resources to use for the resource allocation request. Resource allocation system 106 may identify one or more alternate resources 30 for use with the allocation request 10 in response to determining that a capacity related allocation failure is likely to occur in the selected region. Alternate resources 30 may include, but are not limited to, alternate region resources 32 or alternate size resources 34. Alternate region resources 32 may include the requested resource in a different region. For example, the requested resource may be available in a nearby geographical region or a region pair of the original requested geographical region. Alternate size resources 34 may include resource subtypes like the requested resource that are available in the original requested geographical region.

In an implementation, ranking engine 18 may generate a ranked list 202 of alternate resources 30. The ranked list 202 of alternate resources 30 may include a plurality of alternate region resources 32*a-n* associated with a rank 26*a-n* and/or a plurality of alternate size resources 34*a-n* associated with a rank 26*a-n*. The plurality of alternate region resources 32*a-n* and/or the plurality of alternate size resources 34*a-n* may be ranked hierarchically in an order relative to one another using the associated rank 26*a-n*. The ranks 26*a-n* may be generated by ranking engine 18 in response to one or more rankings of the alternate resources 30.

In an implementation, ranking engine 18 may use deployment parameters 12 to perform a level one ranking of available alternate resources 30 using by applying one or more of a size ranker 20, a region ranker 22, a capacity ranker 24 to the available alternate resources 30. A level one ranking 302 of available alternate resources 30 may include applying a size ranker 20, a region ranker 22, a first capacity ranker 24 and/or a second capacity ranker 25 to the available alternate resources 30. Each of the size ranker 20, region ranker 22, first capacity ranker 24 and/or second capacity ranker 25 may provide independent rankings of the alternate resources 30. Level one rankers (e.g., size ranker 20, region ranker 22, first capacity ranker 24, second capacity ranker 25) may be added or removed from ranking engine 18 in response to business needs.

For example, size ranker 20 may order the alternate resources 30 using size. Size ranker 20 may identify alternate resources 30 with the same or similar size (e.g., same or similar number of RAM, CPU, and/or storage) as the requested size. For example, alternate resources 30 with sizes similar to, or the same as, the requested size may have a higher rank relative to alternate resources 30 with sizes different from the requested size.

In addition, region ranker 22 may order the alternate resources 30 using region. Region ranker 22 may identify other geographical regions in the same geography and/or same data center as the requested region in order to identify alternate resources 30 nearby or close to the requested region. For example, alternate resources 30 in the same geographical region or a nearby geographical region may have a higher rank relative to alternate resources 30 in a geographical region further away from the requested geographical region.

Capacity rankers 24, 25 may order the alternate resources 30 using an available capacity of the regions of the alternate resources 30. The capacity rankers 24, 25 may order the alternate resources 30 using the available capacity and/or predicted capacity (e.g., when a region may lose capacity) of the regions of the alternate resources 30. For example, alternate resources 30 in a geographical region predicted to have capacity for the requested resource may have a higher ranking relative to alternate resources 30 in a geographical region where the requested resource is predicted to be unavailable within a number of days (e.g., one week).

In an implementation, ranking engine 18 may perform a second level of ranking on the ranked list 202 of alternate resources 30. The second level of ranking may apply weights 28 to the ranked list of alternate resources 304 to create a combined score for the ranks associated with the alternate resources 30. The weights 28 may be determined using a combination of machine learning and/or domain experts. For example, the highest weight 28 may be for capacity ranker, followed by size and then region. The output of the second level of ranking may include a weighted ranked list of alternate resources 308. The alternate resources 30 may be ranked in an order relative to one another using the associated ranks, where the order is based on the highest available capacity, size most similar to the requested size, and region closest to the requested region.

At 410, method 400 may optionally include updating the ranked list of alternate resources by applying one or more restrictions. Restriction manager 36 may receive the weighted ranked list of alternate resources 308 and may apply one or more restrictions 38 or other business policies to further improve the list of alternatives and generate a revised ranked list of alternate resources 310. An order of the alternate resources 30 may change in response to the restrictions 38 or other business policies. For example, older alternate resources 30 may be ranked lower than newer alternate resources 30 in response to a business policy to promote newer resources.

In addition, alternate resources 30 may be annotated as blocked from the revised ranked list of alternate resources 310, or otherwise prevented from inclusion on the revised ranked list of alternate resources 310, if a quota limit of a customer does not allow the use of the alternate resources 30. In addition, alternate resources 30 may be blocked from the revised ranked list of alternate resources 310 in response to business policies preventing the use of the alternate resources 30. For example, if a business policy prevents new virtual machines in a specific region, the alternate resources 30 from the specific region may be annotated as blocked from the revised ranked list of alternate resources 310. As such, the revised ranked list of alternate resources 310 may only include available options to customers to proactively prevent resource allocation failures.

At 412, method 400 may include providing a recommendation with the ranked list of alternate resources. A recommendation engine 40 may receive the revised ranked list of alternate resources 310 and may generate one or more recommendations 42. Recommendations 42 may include the revised ranked list of alternate resources 310 for use for the resource allocation request 10. In addition, recommendations 42 may include a confidence rating 44 indicating a chance of allocation success for the resource allocation request 10.

Method 400 may be used to show a prediction of allocation success within a specified time period to customers via various customer interfaces so that customers may proactively plan out deployments in a desired region. Method 400 may also provide customers flexibility in moving forward with a resource allocation request if another option may be substituted for the original request.

Figure 5:
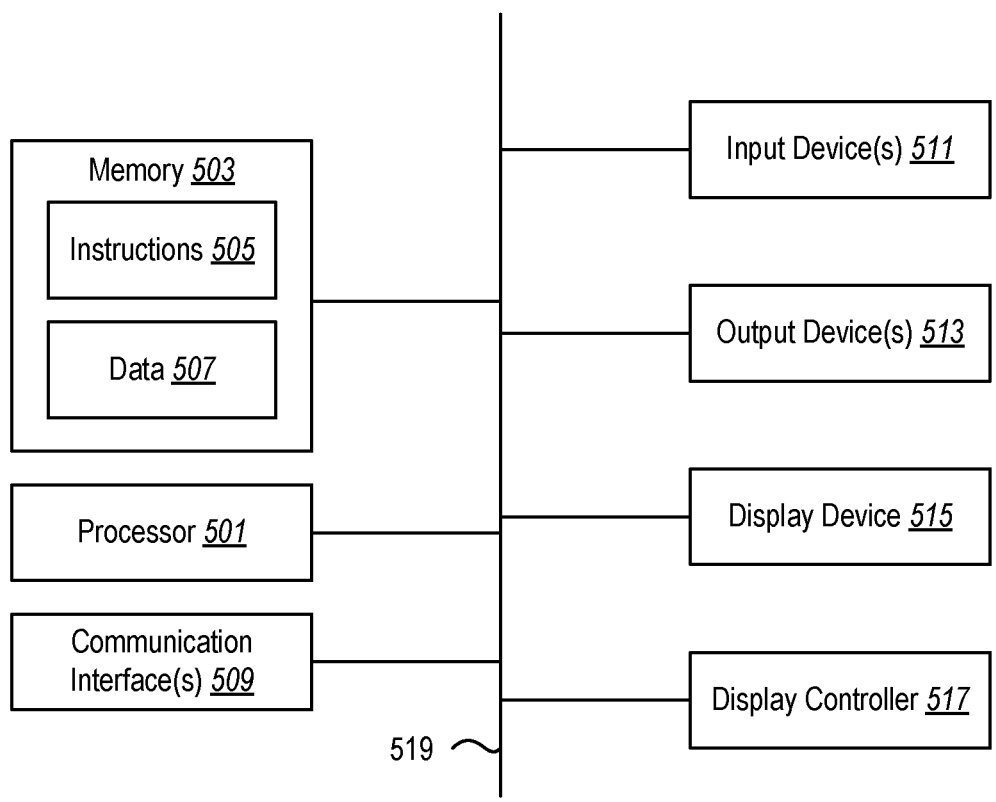
FIG. 5 illustrates certain components that may be included within a computer system.

FIG. 5 illustrates certain components that may be included within a computer system 500. One or more computer systems 500 may be used to implement the various devices, components, and systems described herein.

The computer system 500 includes a processor 501. The processor 501 may be a general-purpose single or multi-chip microprocessor (e.g., an Advanced RISC (Reduced Instruction Set Computer) Machine (ARM)), a special purpose microprocessor (e.g., a digital signal processor (DSP)), a microcontroller, a programmable gate array, etc. The processor 501 may be referred to as a central processing unit (CPU). Although just a single processor 501 is shown in the computer system 500 of FIG. 5, in an alternative configuration, a combination of processors (e.g., an ARM and DSP) could be used.

The computer system 500 also includes memory 503 in electronic communication with the processor 501. The memory 503 may be any electronic component capable of storing electronic information. For example, the memory 503 may be embodied as random access memory (RAM), read-only memory (ROM), magnetic disk storage mediums, optical storage mediums, flash memory devices in RAM, on-board memory included with the processor, erasable programmable read-only memory (EPROM), electrically erasable programmable read-only memory (EEPROM) memory, registers, and so forth, including combinations thereof.

Instructions 505 and data 507 may be stored in the memory 503. The instructions 505 may be executable by the processor 501 to implement some or all of the functionality disclosed herein. Executing the instructions 505 may involve the use of the data 507 that is stored in the memory 503. Any of the various examples of modules and components described herein may be implemented, partially or wholly, as instructions 505 stored in memory 503 and executed by the processor 501. Any of the various examples of data described herein may be among the data 507 that is stored in memory 503 and used during execution of the instructions 505 by the processor 501.

A computer system 500 may also include one or more communication interfaces 509 for communicating with other electronic devices. The communication interface(s) 509 may be based on wired communication technology, wireless communication technology, or both. Some examples of communication interfaces 509 include a Universal Serial Bus (USB), an Ethernet adapter, a wireless adapter that operates in accordance with an Institute of Electrical and Electronics Engineers (IEEE) 802.11 wireless communication protocol, a Bluetooth® wireless communication adapter, and an infrared (IR) communication port.

A computer system 500 may also include one or more input devices 511 and one or more output devices 513. Some examples of input devices 511 include a keyboard, mouse, microphone, remote control device, button, joystick, trackball, touchpad, and lightpen. Some examples of output devices 513 include a speaker and a printer. One specific type of output device that is typically included in a computer system 500 is a display device 515. Display devices 515 used with implementations disclosed herein may utilize any suitable image projection technology, such as liquid crystal display (LCD), light-emitting diode (LED), gas plasma, electroluminescence, or the like. A display controller 517 may also be provided, for converting data 507 stored in the memory 503 into text, graphics, and/or moving images (as appropriate) shown on the display device 515.

The various components of the computer system 500 may be coupled together by one or more buses, which may include a power bus, a control signal bus, a status signal bus, a data bus, etc. For the sake of clarity, the various buses are illustrated in FIG. 5 as a bus system 519.

The techniques described herein may be implemented in hardware, software, firmware, or any combination thereof, unless specifically described as being implemented in a specific manner. Any features described as modules, components, or the like may also be implemented together in an integrated logic device or separately as discrete but interoperable logic devices. If implemented in software, the techniques may be realized at least in part by a non-transitory processor-readable storage medium comprising instructions that, when executed by at least one processor, perform one or more of the methods described herein. The instructions may be organized into routines, programs, objects, components, data structures, etc., which may perform particular tasks and/or implement particular data types, and which may be combined or distributed as desired in various implementations.

The steps and/or actions of the methods described herein may be interchanged with one another without departing from the scope of the claims. In other words, unless a specific order of steps or actions is required for proper operation of the method that is being described, the order and/or use of specific steps and/or actions may be modified without departing from the scope of the claims.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The terms "comprising," "including," and "having" are intended to be inclusive and mean that there may be additional elements other than the listed elements. Additionally, it should be understood that references to "one implementation" or "an implementation" of the present disclosure are not intended to be interpreted as excluding the existence of additional implementation s that also incorporate the recited features. For example, any element or feature described in relation to an implementation herein may be combinable with any element or feature of any other implementation described herein, where compatible.

The present disclosure may be embodied in other specific forms without departing from its spirit or characteristics. The described implementations are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A method, comprising:
receiving a resource allocation request for a new resource in a computing system, wherein the resource allocation request identifies a resource subtype of the new resource and a region for the new resource;
predicting an occurrence of a capacity related allocation failure for the resource allocation request using capacity predictions derived from supply chain modeling of a capacity in the region requested;
identifying a ranked list of alternate resources to use for the resource allocation request in response to the predicting of the occurrence of the capacity related allocation failure; and
providing at least one recommendation with the ranked list of alternate resources with different options for the resource allocation, wherein the at least one recommendation comprises a confidence rating of the occurrence of the capacity related allocation failure and the confidence rating is based on one or more restrictions preventing the resource allocation request.

2. The method of claim 1, wherein the capacity related allocation failure occurs in response to a resource being unavailable or a resource availability being unexpectedly reduced.

3. The method of claim 1, wherein the ranked list of alternate resources includes alternate region resources or alternate size resources.

4. The method of claim 1, wherein identifying a ranked list of alternate resources comprises:
applying a first level ranking to a plurality of alternate resources, wherein the first level ranking includes one or more of a size ranking, a region ranking, or a capacity ranking;
generating an associated rank for each of the plurality of alternate resources in response to the first level ranking; and
placing the plurality of alternate resources in an order relative to each other in the ranked list of alternate resources using the associated rank.

5. The method of claim 4, wherein identifying the ranked list of alternate resources further comprises:
applying a second level ranking to the plurality of alternate resources, wherein the second level ranking generates a weighted ranked list of alternate resources, and wherein the at least one recommendation includes the weighted ranked list of alternate resources.

6. The method of claim 1, further comprising:
updating the ranked list of alternate resources by annotating the alternate resources as blocked from the ranked list of alternate resources in response to applying one or more restrictions to the ranked list of alternate resources.

7. The method of claim 1, further comprising:
updating the ranked list of alternate resources by changing an order of a plurality of alternate resources in response to applying one or more restrictions to the ranked list of alternate resources.

8. The method of claim 1, wherein the new resource is a cloud resource.

9. A system, comprising:
at least one memory to store data and instructions;
at least one processor in communication with the at least one memory; and
instructions stored in the memory, the instructions being executable by the at least one processor to:
receive a resource allocation request for a new resource, wherein the resource allocation request identifies a resource subtype of the new resource and a region for the new resource;
predict an occurrence of a capacity related allocation failure for the resource allocation request using capacity predictions derived from supply chain modeling of a capacity in the region requested;
identify a ranked list of alternate resources to use for the resource allocation request in response to predicting of the occurrence of the capacity related allocation failure; and
provide at least one recommendation with the ranked list of alternate resources with different options for the resource allocation, wherein the at least one recommendation comprises a confidence rating of the occurrence of the capacity related allocation failure and the confidence rating is based on one or more restrictions preventing the resource allocation request.

10. The system of claim 9, wherein the capacity related allocation failure occurs in response to a resource being unavailable or a resource availability being unexpectedly reduced.

11. The system of claim 9, wherein the ranked list of alternate resources includes alternate region resources or alternate size resources.

12. The system of claim 9, wherein the at least one processor is further configured to:
apply a first level ranking to a plurality of alternate resources, wherein the first level ranking includes one or more of a size ranking, a region ranking, or a capacity ranking;
generate an associated rank for each of the plurality of alternate resources in response to the first level ranking; and
place the plurality of alternate resources in an order relative to each other in the ranked list of alternate resources using the associated rank.

13. The system of claim 12, wherein the at least one processor is further configured to:
apply a second level ranking to the plurality of alternate resources, wherein the second level ranking generates a weighted ranked list of alternate resources, and wherein the at least one recommendation includes the weighted ranked list of alternate resources.

14. The system of claim 9, wherein the at least one processor is further configured to update the ranked list of alternate resources by annotating the alternate resources as blocked from the ranked list of alternate resources in response to applying one or more restrictions to the ranked list of alternate resources.

15. The system of claim 9, wherein the at least one processor is further configured to update the ranked list of alternate resources by changing an order of a plurality of alternate resources in response to applying one or more restrictions to the ranked list of alternate resources.

16. A non-transitory computer-readable medium storing instructions executable by a computer device, comprising:
at least one instruction for causing the computer device to receive a resource allocation request for a new resource, wherein the resource allocation request identifies a resource subtype of the new resource and a region for the new resource;

at least one instruction for causing the computer device to predict an occurrence of a capacity related allocation failure for the resource allocation request using capacity predictions derived from supply chain modeling of a capacity in the region requested;

at least one instruction for causing the computer device to identify a ranked list of alternate resources to use for the resource allocation request in response to the predicting of the occurrence of the capacity related allocation failure; and at least one instruction for causing the computer device to provide at least one recommendation with the ranked list of alternate resources with different options for the resource allocation, wherein the at least one recommendation comprises a confidence rating of the occurrence of the capacity related allocation failure and the confidence rating is based on one or more restrictions preventing the resource allocation request.

* * * * *